(12) United States Patent
Chan et al.

(10) Patent No.: US 6,590,047 B1
(45) Date of Patent: Jul. 8, 2003

(54) MODIFIED COPOLYMER OF OLEFIN AND CYCLOOLEFIN

(75) Inventors: Shu-Hua Chan, Miao-Li Hsien (TW); Chi-Lan Li, Taichung Hsien (TW); Ching Ting, Hsinchu (TW); Joung-Yei Frank Chen, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 36 days.

(21) Appl. No.: 09/628,950

(22) Filed: Jul. 28, 2000

(51) Int. Cl.[7] ................................................. C08F 4/42
(52) U.S. Cl. ................ 526/160; 536/308; 536/348; 536/335; 536/346; 536/347.1; 536/137; 536/943
(58) Field of Search ................ 526/308, 348, 526/335, 346, 347.1, 137, 160, 943

(56) References Cited

U.S. PATENT DOCUMENTS

| 5,430,118 A | * | 7/1995 | Powers et al. | ............... 526/347 |
| 5,866,659 A | * | 2/1999 | Chung et al. | ................ 525/279 |
| 5,874,512 A | * | 2/1999 | Farley et al. | ................ 526/308 |
| 6,103,920 A | * | 8/2000 | Johnson et al. | ............. 556/140 |

* cited by examiner

*Primary Examiner*—Ling-Siu Choi
(74) *Attorney, Agent, or Firm*—Sughrue Mion, PLLC

(57) ABSTRACT

The present invention provides an olefin/cycloolefin/alkylstyrene copolymer which is non-functionalized, functionalized, or grafted. By the functionalization of the benzylic protons of the alkylstyrene unit, the copolymer can be functionalized. The functionalized or grafted olefin/cycloolefin/alkylstyrene copolymer has good adhesion to a substrate and good compatibility with other polymers compared with the non-functionalized copolymer.

10 Claims, No Drawings

MODIFIED COPOLYMER OF OLEFIN AND CYCLOOLEFIN

BACKGROUND OF THE INVENTION

1. Field of the Invention

The present invention relates to an olefin/cycloolefin/alkylstyrene copolymer, and more particularly to a functionalized olefin/cycloolefin/alkylstyrene copolymer which have enhanced properties such as good adhesion to a substrate and good compatibility with other polymers.

2. Description of the Prior Art

Non-functionalized cycloolefin copolymer (COC) are of high transparency and hardness and of low density. Furthermore, they are virtually chemically and moisture inert and are highly resistant to heat deformation. However, since non-functionalized COCs have non-polar molecular structure, they have poor adhesion to the substrate and poor compatibility with most other polymers.

Many researchers have drawn their attentions to synthesize functionalized cycloolefin copolymer in order to improve the adhesion properties and compatibility with other polymers. For example, Kreuder et al. in U.S. Pat. No. 5,756,623 have disclosed an ene-functionalized COC, which includes polymerized units of at least one cycloolefin, polymerized units of at least one olefin containing at least one double bond, polymerized units of at least alpha olefins, and polymerized units which possess at least two electron-withdrawing groups which are carbonyl or nitrile.

In JP 5279412, an unsaturated copolymer is obtained by compolymerizing $C_2$–$C_{12}$ alpha olefin and a cyclic olefin containing alkylidene group or alkenyl group. Then, the unsaturated copolymer is oxidized with a peracid. Thus, the double bond of the alkylidene group or alkenyl group in the unsaturated copolymer is oxidized and epoxy group and/or OH group is introduced to the double bond.

In JP 5279413, an unsaturated copolymer similar to JP 5279412 is first obtained. Then, the unsaturated copolymer is reacted with a halogen or a hydrogen halide. As a result, the halogen group is introduced to the double bond in the unsaturated copolymer.

In JP 5287015, an unsaturated copolymer similar to JP 5279412 is first obtained. Then, amino group is introduced to the double bond in the unsaturated copolymer.

Chung et al. in U.S. Pat. No. 5,543,484 have disclosed a functionalized α-olefin/para-alkylstyrene copolymer. First, α-olefin and para-alkylstyrene are copolymerized. The incorporation of p-alkylstyrene into the α-olefin polymer results in the generation of benzylic protons, which are readily available for many chemical reactions, thereby introducing functional groups at the benzylic position under mild reaction conditions. Then, the olefin/p-alkylstyrene copolymer is functionalized by the functionalization of benzylic protons in p-alkylstyrene units. Such functionalization leads to improvement in the physical properties of the original olefin polymers.

SUMMARY OF THE INVENTION

An object of the present invention is to provide an olefin/cycloolefin/alkylstyrene copolymer, and more particularly a functionalized olefin/cycloolefin/alkylstyrene copolymer. By the functionalization of benzylic protons in alkylstyrene units, the olefin/cycloolefin/alkylstyrene copolymer can have good adhesion to the substrate and good compatibility with other polymers.

To achieve the above-mentioned object, the olefin/cycloolefin/alkylstyrene copolymer of the present invention includes the following repeating units:

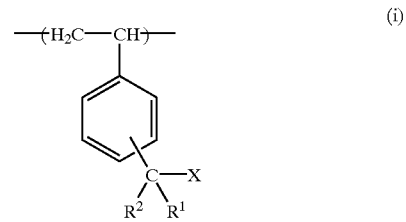

(i)

wherein
$R^1$ and $R^2$ are independently selected from the group consisting of hydrogen, alkyl, and primary and secondary haloalkyl,
X can be the same or different and is selected from the group consisting of (1) hydrogen, (2) a functional group, (3) a polymer moiety, (4) an alkali or alkaline earth metal, and (5) mixtures thereof, wherein the functional group is selected from a group containing halogen, oxygen, sulfur, silicon, nitrogen, carbon, phosphorus, and mixtures thereof;

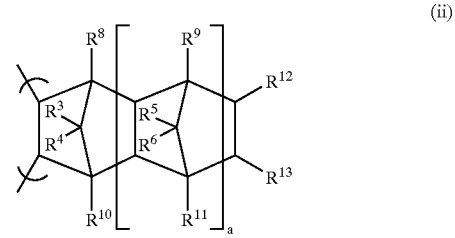

(ii)

wherein
a is an integer from 0 to 3,
$R^3$, $R^4$, $R^5$, $R^6$, $R^8$, $R^9$, $R^{10}$, and $R^{11}$ can be the same or different and are selected from the group consisting of hydrogen, halogen, $C_{1-10}$ alkyl, and haloalkyl and $R^{12}$ and $R^{13}$ can be the same or different and are selected from the group consisting of hydrogen, halogen, $C_{1-10}$ alkyl, haloalkyl, aryl, haloaryl, alcohol, ester, and acid, or $R^{12}$ and $R^{13}$ can be bonded together to form formula (III)

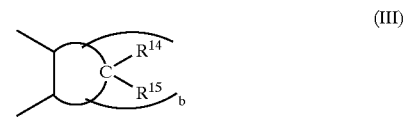

(III)

wherein
$R^{14}$ and $R^{15}$ can be the same or different and are selected from the group consisting of hydrogen, halogen, $C_{1-10}$ alkyl, and haloalkyl and
b is an integer from 3 to 5; and

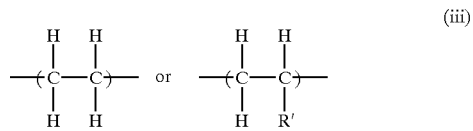

(iii)

wherein
R' is $C_1$ to $C_{18}$ linear and branched alkyl, and most preferably R' is $C_1$ to $C_5$ primary or secondary alkyl.

DETAILED DESCRIPTION OF INVENTION

The feature of the present invention is to introduce an alkylstyrene unit to an olefin/cycloolefin copolymer in order to obtain an olefin/cycloolefin/alkylstyrene copolymer. It is the first an olefin/cycloolefin/alkylstyrene copolymer is synthesized.

The incorporation of the alkylstyrene unit into the olefin/cycloolefin copolymer results in the generation of benzylic protons, which are readily available for many chemical reactions. Many functional groups can be introduced to the benzylic position under mild reaction conditions. By the functionalization, the adhesion to the substrate and the compatibility with other polymers can be improved compared with the non-functionalized olefin/cycloolefin/alkylstyrene copolymer.

The general process for preparing the olefin/cycloolefin/alkylstyrene copolymer of the present invention will be described below.

First, monomers (A), (B), (C), and optionally (D) are copolymerized to form an olefin/cycloolefin/alkylstyrene copolymer.

Monomer (A) is in an amount of 0.1–50 mol % and is an alkylstyrene represented by formula (I)

$$H_2C=CH-\text{Ar}-C(R^1)(R^2)-X \quad (I)$$

wherein
  $R^1$ and $R^2$ are independently selected from the group consisting of hydrogen, alkyl, and primary and secondary haloalkyl. Preferably, $R^1$ and $R^2$ are independently selected from the group consisting of hydrogen, $C_1$ to $C_5$ alkyl, and $C_1$ to $C_5$ primary and secondary haloalkyl.

Monomer (B) is in an amount of 1–99 mol % and is an cycloolefin represented by formula (II)

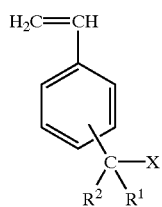

(II)

wherein
  a is an integer from 0 to 3,
  $R^3$, $R^4$, $R^5$, $R^6$, $R^8$, $R^9$, $R^{10}$, and $R^{11}$ can be the same or different and are selected from the group consisting of hydrogen, halogen, $C_{1-10}$ alkyl, and haloalkyl and
  $R^{12}$ and $R^{13}$ can be the same or different and are selected from the group consisting of hydrogen, halogen, $C_{1-10}$ alkyl, haloalkyl, aryl, haloaryl, alcohol, ester, and acid, or $R^{12}$ and $R^{13}$ can be bonded together to form formula (III)

$$\text{(III)} \quad \text{ring with } R^{14}, R^{15}, b$$

wherein
  $R^{14}$ and $R^{15}$ can be the same or different and are selected from the group consisting of hydrogen, halogen, $C_{1-10}$ alkyl, and haloalkyl and
  b is an integer from 3 to 5.

Monomer (C) is in an amount of 0.1–98.9 mol % and is ethylene, an $C_{3-20}$ α-olefin, or mixtures thereof.

Monomer (D) is in an amount of 0–50 mol % and is a non-conjugated diene.

The olefin/cycloolefin/alkylstyrene copolymer obtained above contains an alkylstyrene unit represented by $$-(H_2C-CH)- \text{Ar}-C(R^1)(R^2)-H \quad (v)$$

wherein
  $R^1$ and $R^2$ are independently selected from the group consisting of hydrogen, alkyl, and primary and secondary haloalkyl.

Then, the alkyltyrene unit-containing copolymer is subjected to halogenation to obtain a cycloolefin copolymer containing the repeating unit (vi)

$$-(H_2C-CH)- \text{Ar}-C(R^1)(R^2)-X \quad (vi)$$

wherein X contains halogen.

The halogenated copolymer is very reative on the halogen group and is readily to undergo various reaction to form other functional groups. For example, the halogenated copolymer can be reacted with a nucleophile selected from a compound containing oxygen, sulfur, silicon, nitrogen, carbon, and phosphorus to obtain a cycloolefin copolymer containing the following repeating unit (vi)

$$-(H_2C-CH)- \text{Ar}-C(R^1)(R^2)-X \quad (vi)$$

wherein X contains an element selected from the group consisting of oxygen, sulfur, silicon, nitrogen, carbon, and phosphorus.

When some of the X groups contain oxygen, the oxygen-containing group can be alkoxides, phenoxides or carboxylates.

When some of the X groups contain sulfur, the sulfur-containing group can be thiolates, thiophenolates, thioethers, thiocarboxylates, dithiocarboxylates, thioureas, dithiocarbamates, xanthates or thiocyanates.

When some of the X groups contain silicon, the silicon-containing group can be silanes or halosilanes.

When some of the X groups contain nitrogen, the nitrogen-containing group can be amides, amines, carbazoles, phthalimides, pyridines, maleimides or cyanates.

Some of the X groups can also be functionalized to malonates, cyanides, phosphine, phosphite, or $CR^{31}_3$, wherein each $R^{31}$ is an organic radical.

In addition, the benzylic protons of the olefin/cycloolefin/alkylstyrene copolymer is readily to undergo grafting of a polymer moiety. Also, a halogenated olefin/cycloolefin/alkylstyrene copolymer is readily to undergo grafting of a polymer moiety.

The grafting techniques can be classified into "graft-from" and "graft-on". Graft-from technique involves the reaction of an olefin/cycloolefin/alkylstyrene copolymer and a monomer via anionic polymerization, cationic polymerization, anionic or cationic ring-open polymerization, or free radical polymerization. A "graft-from" anionic polymerization is as follows (only the alkylstyrene unit is shown for simplification):

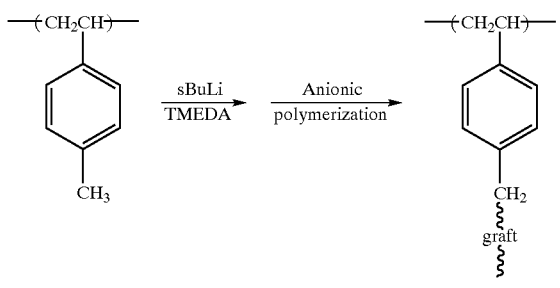

The reaction of a halogenated (such as brominated) olefin/cycloolefin/alkylstyrene copolymer with a monomer via cationic polymerization is as follows (only the alkylstyrene unit is shown for simplification):

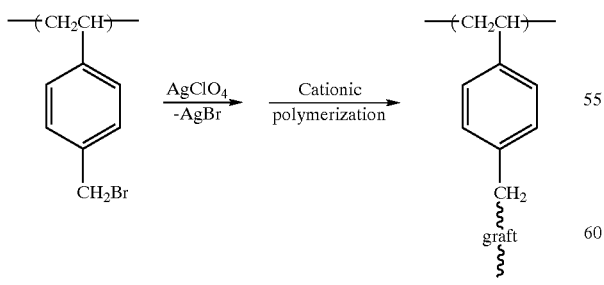

The reaction of a halogenated (such as brominated) olefin/cycloolefin/alkylstyrene copolymer with a monomer via free radical polymerization is as follows (only the alkylstyrene unit is shown for simplification):

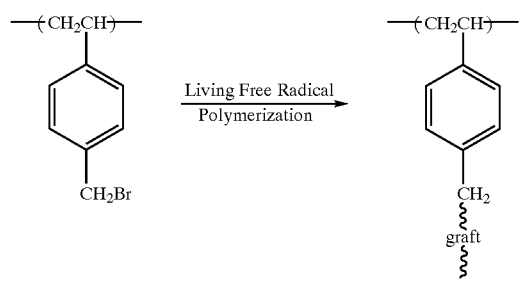

The "graft-on" technique involves the reaction of a functionalized olefin/cycloolefin/alkylstyrene copolymer and a polymer which can react with the functional group of such an olefin/cycloolefin/alkylstyrene copolymer, such that the polymer bonds to the functionalized olefin/cycloolefin/alkylstyrene copolymer and grafting is achieved.

In the repeating unit (i), when the X group contains a polymer moiety, the polymer moiety can be polymers and copolymers of anionically polymerizable monomers, cationically polymerizable monomers, anionically and cationically ring-openable monomers, or free radical polymerizable monomers.

Representative examples of the anionically polymerizable monomers include conjugated dienes, vinyl aromatic compounds, vinyl unsaturated amides, acenaphthylene, 9-acrylcarbazole, acrylonitrile, methacrylonitrile, organic isocyanates, acrylates, methacrylates, alkyl acrylates, alkyl methacrylates, glycidyl methacrylates, vinyl pyridines, and mixtures thereof.

Representative examples of the cationically polymerizable monomers include vinyl aromatic compounds, vinyl ethers, N-vinylcarbazole, isobutene, and mixtures thereof.

Representative examples of the ring-openable monomers include cyclic ethers, sulfides, lactones, lactams, N-carboxyanhydrides, cyclic anhydrides, and mixtures thereof.

Representative examples of the free radical polymerizable monomers include vinyl aromatic compounds, conjugated dienes, acrylates, methacrylates, alkyl acrylates, alkyl methacrylates, vinyl acetates, and mixtures thereof.

According to the present invention, if the monomer (D) (a non-conjugated diene) is present for the copolymerization, then an olefin/cycloolefin/alkylstyrene/non-conjugated diene copolymer is obtained. In such a copolymer, there is a residual double bond left, and the double bond is readily available for many chemical reactions. Many functional groups can be introduced to the copolymer via the reaction of the double bond. Thus, the copolymer can be modified according to various requirements.

Preferably, the non-conjugated diene used in the present invention can be a non-conjugated cyclic diene. Suitable non-conjugated cyclic diene can be selected from the group consisting of

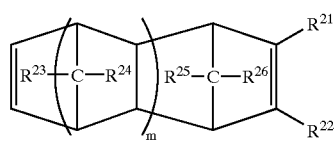

(IV)

-continued

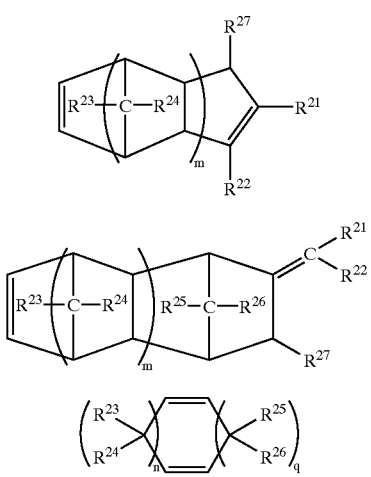

wherein
$R^{21}$, $R^{22}$, $R^{23}$, $R^{24}$, $R^{25}$, $R^{26}$ and $R^{27}$ can be the same or different and are selected from the group consisting of hydrogen, $C_{1-8}$ alkyl, $C_{6-14}$ aromatic group, and $C_{2-15}$ alkenyl, m, n, and q can be the same or different and is an integer of 0 to 3.

A representative example of such a non-conjugated cyclic diene is 5-ethylidene-2-norbornene (ENB).

The reaction of the residual double bond of the olefin/cycloolefin/alkylstyrene/non-conjugated diene is described below. The olefin/cycloolefin/alkylstyrene/non-conjugated diene copolymer can be reacted with a compound which is reactive with a double bond such that the residual double bond of the non-conjugated diene is functionalized to form a group selected from epoxy, halogen, ether, alcohol, sulfate, borane, borate, aldehyde, and ketone.

When the residual double bond of the non-conjugated diene is functionalized to form epoxy, the epoxidated copolymer can further be subjected to a ring-opening reaction. By means of the ring-opening reaction of the epoxy group of the epoxidated copolymer, the copolymer can contain —R, —OH, —OR, or —$NH_2$ after the ring-opening reaction, wherein R is selected from the group consisting of alkyl, complete halogenated alkyl, and partial halogenated alkyl.

According to the present invention, the monomers (A), (B), (C), and optionally (D) can be conducted in the presence of a catalyst composition including a single-site catalyst, preferably a metallocene catalyst, and an activating cocatalyst. Preferred metallocenes include zirconocene and titanocene coordination compounds with single or double cyclopentadienyl derivatives which form the constrained ligand geometry. The activating cocatalyst can be aluminoxane such as methyl aluminoxane (MAO), a trialkyl aluminum, a dialkyl aluminum halide, a salt of an inert and non-coordinating anion, or a mixture thereof. Preferably, the catalyst composition includes a metallocene and methyl aluminoxane.

The following examples are intended to illustrate the process and the advantages of the present invention more fully without limiting its scope, since numerous modifications and variations will be apparent to those skilled in the art.

EXAMPLE 1

Synthesis of an m-Cycloolefin Copolymer (mCOC) Containing 4-Methylstyrene 30 ml of the purified 4-methylstyrene monomer and 170 ml of 85 wt % norbornene monomer were placed in a 450 ml metal reactor under nitrogen. 2.8 ml of 10 wt % MAO (methyl aluminoxane) was then added into the reactor. After the reactor was heated to 90° C., 0.0208 mmol of ([cyclobutylidene(1-$\eta^5$-cyclopentadienyl)(1-$\eta^5$-indenyl)bis (dimethylamino)zirconium]) was added. Then, ethylene at a pressure of 150 psi was introduced into the reactor, and the polymerization proceeded for 30 minutes.

After the completion of the polymerization reaction, a sodium hydroxide/methanol solution was added to terminate the reaction, and then acetone was used to precipitate the polymer product. The product was then extracted with acetone by the Soxhlet extraction method, filtered, and dried to give a final copolymer (23 g). The copolymer contained 1.68 mole percent of 4-methylstyrene, which was determined by $^1H$ NMR. Tg was 167° C. determined by DSC.

EXAMPLE 2

Bromination of mCOC 3 g of the 4-methylstyrene containing-mCOC obtained from Example 1 was placed in a round-bottom bottle and dissolved in 150 ml cyclohexane. The solution was refluxed in an oil bath under nitrogen for 1 hour and then allowed to warm to the reaction temperature. Bromine water ($Br_2$) was diluted with cyclohexane to 1 ml and placed in a titration tube wrapped with aluminum foil. The solution in the round-bottom bottle was radiated with a 90W light bulb, and the bromine solution in the titration tube was added to the bottle dropwisely over 20 minutes. A solution of NaOH in methanol was added to the polymer solution obtained to terminate the reaction. The brominated polymer was washed with water and methanol, and dried under vacuum at 60° C. From $^1H$ NMR spectrum, it was observed that there was —$CH_2Br$ peak at 4.4 ppm.

EXAMPLE 3

Amination of mCOC 1 g of the brominated mCOC obtained from Example 2 and 100 ml toluene were placed in a 250 ml reactor and refluxed and stirred in an oil bath at 80° C. under nitrogen for about 0.5 hours. The copolymer particles were dissolved and the solution was pale yellow in color and transparent.

The temperature of the oil bath was decreased to 50° C., and 15 ml of an isopropanol solution containing 0.3 g of diethanolamine was gradually added and stirred continuously. The mixture was refluxed in an oil bath at 50° C. under nitrogen for 10 hours. Then, the reaction solution was poured into 200 ml of methanol to precipitate the polymer product. The aminated polymer obtained was washed with 50% (v/v) methanol/$H_2O$ for three times and then dried under vacuum at 70° C. for 16 hours. From $^1H$ NMR spectrum, it was observed that the chemical shift of —$CH_2Br$ (4.4 ppm) disappeared and two chemical shifts at 3.6 ppm and 3.3 ppm appeared.

EXAMPLE 4 mCOC-g-Polystyrene 1.04 g of the mCOC (containing 1.68 mol % of 4-methylstyrene) obtained from Example 1 was placed in a 300 ml round-bottom bottle, and then 150 ml of the purified dry pentane and 5 ml of n-butyl lithium (1.6 M in hexane) were added to the mCOC/pentane solution. The mixture was stirred continuously at 30° C. for 20 hours. The round-bottom bottle was moved into a glove box, and the reaction mixture was washed with n-pentane repeatedly, filtered, and added with 100 ml of n-pentane. The round-bottom bottle was then removed from the glove box. 2 ml of the purified styrene was injected with a syringe to the bottle and stirred at room temperature for 30 minutes. A large quantity of methanol was added to terminate the reaction. The resulting polymer was filtered, collected, and extracted with methyl ethyl ketone (MEK) at room temperature. The soluble and insoluble polymer fractions were separated by centrifuge. mCOC-g-polystyrene which is insoluble in MEK was thus obtained.

EXAMPLE 5 mCOC-g-Polypentafluorostyrene 1.04 g of the mCOC (containing 1.68 mol % of 4-methylstyrene) obtained from Example 1 and 1.5 ml of TMEDA (tetramethylethylene diamine) were placed in a 300 ml round-bottom bottle, and then 150 ml of the purified dry pentane and 5 ml of n-butyl lithium (1.6 M in hexane) were added to the mCOC/pentane solution. The mixture was stirred continuously at 35° C. for 20 hours. The round-bottom bottle was moved into a glove box, and the reaction mixture was washed with n-pentane repeatedly, filtered, and added with 100 ml of n-pentane. The round-bottom bottle was then removed from the glove box. 2 ml of the purified pentafluorostyrene was injected with a syringe to the bottle and stirred at room temperature for 20 hours. A large quantity of methanol was added to terminate the reaction. The resulting polymer was filtered, collected, and extracted with methyl ethyl ketone (MEK) at room temperature. The soluble and insoluble polymer fractions were separated by centrifuge. mCOC-g-polypentafluorostyrene which is insoluble in MEK was thus obtained.

EXAMPLE 6

Synthesis of an mCOC Containing Unsaturated Double Bonds 95 ml of the purified ENB (5-ethylidene-2-norbornene), 5 ml of 4-methylstyrene, and 100 ml of 85 wt % norbornene monomer were placed in a 450 ml metal reactor under nitrogen. 2.8 ml of 10 wt % MAO (methyl aluminoxane) was then added into the reactor. After the reactor was heated to 90° C., 0.0208 mmol of ([cyclobutylidene(1-$\eta^5$-cyclopentadienyl)(1-$\eta^5$-indenyl)bis(dimethylamino) zirconium]) was added. Then, ethylene at a pressure of 150 psi was introduced into the reactor, and the polymerization proceeded for 30 minutes.

After the completion of the polymerization reaction, a sodium hydroxide/methanol solution was added to terminate the reaction, and then acetone was used to precipitate the polymer product. The product was then extracted with acetone by the Soxhlet extraction method for 24 hours, filtered, and dried to give a final copolymer (23 g). The copolymer contained 0.36 mol % of 4-methylstyrene and 15 mol % of ENB, which was determined by $^1$H NMR. Also, from the $^1$H NMR spectrum, it was observed that the chemical shift of the double bond (5.2 ppm) appeared. Tg was 167° C. determined by DSC.

EXAMPLE 7

Epoxidation of Unsaturated Double Bonds-containing mCOC 17.2 g of the double bonds-containing mCOC copolymer (containing 15 mol % ENB) obtained from Example 6 and 100 ml of cyclohexene were placed in a 300 ml Schlenk round-bottom bottle wrapped with aluminum foil, and then 1.72 g of 3-chloroperoxybenzoic acid was added to the mCOC/cyclohexane solution. The reaction was conducted in a dark room at room temperature for 2 hours. Then, the reaction mixture was washed with methanol repeatedly, filtered, and dried under vacuum. From $^1$H NMR spectrum, it was observed that the chemical shift of the double bond (5.2 ppm) disappeared and the chemical shift of epoxy group at 3.0 ppm appeared.

EXAMPLE 8

Ring-opening Reaction of Epoxy Group-containing mCOC 17.2 g of the epoxy group-containing mCOC obtained from Example 7 was placed in a 300 ml Schlenk round-bottom bottle and dissolved with 300 ml of cyclohexane at 60° C. in an oil bath. Then, 2 g of p-toluenesulfonic acid was added, after 5 minutes, 50 ml of $C_2H_2F_3OH$ was added. The reaction was conducted at 50° C. for 3 hours. After the reaction was complete, the polymer solution was precipitated by the addition of methanol, filtered, washed with acetone repeatedly, filtered, and dried under vacuum for 10 hours. From $^1$H NMR spectrum, it was observed that the chemical shift of epoxy group at 3.0 ppm disappeared, and the $CF_3CH_2O$— peak at 3.8 ppm appeared. The mCOC obtained contained hydroxy and ether groups.

The foregoing description of the preferred embodiments of this invention has been presented for purposes of illustration and description. Obvious modifications or variations are possible in light of the above teaching. The embodiments chosen and described provide an excellent illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. An olefin/cycloolefin/alkylstyrene copolymer comprising the following repeating units:

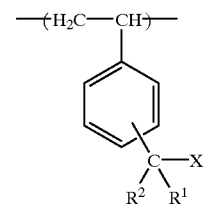

(i)

wherein
$R^1$ and $R^2$ are independently selected from the group consisting of hydrogen, alkyl, and primary and secondary haloalkyl,
X can be the same or different and is selected from the group consisting of a polymer moiety, an alkali or alkaline earth metal, and mixtures thereof;

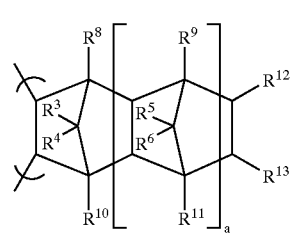

(ii)

wherein
a is an integer from 0 to 3, $R^3$, $R^4$, $R^5$, $R^6$, $R^8$, $R^9$, $R^{10}$, and $R^{11}$ can be the same or different and are selected from group consisting of hydrogen, halogen, $C_{1-10}$ alkyl, and haloalkyl and $R^{12}$ and $R^{13}$ can be the same or different and are selected from the group consisting of hydrogen, halogen, $C_{1-10}$ alkyl, haloalkyl, aryl, haloaryl, alcohol, ester, and acid, or $R^{12}$ and $R^{13}$ can be bonded together to form formula (III)

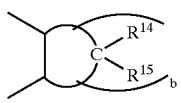
(III)

wherein
$R^{14}$ and $R^{15}$ can be the same or different and are selected from the group consisting of hydrogen, halogen, $C_{1-10}$ alkyl, and haloalkyl and
b is an integer from 3 to 5; and

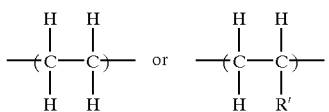
(iii)

wherein
R' is $C_1$ to $C_{18}$ linear or branched alkyl.

2. The olefin/cycloolefin/alkylstyrene copolymer as claimed in claim 1, wherein $R^1$ and $R^2$ are independently selected from the group consisting of hydrogen, $C_1$ to $C_5$ alkyl, and $C_1$ to $C_5$ primary and secondary haloalkyl.

3. The olefin/cycloolefin/alkylstyrene copolymer as claimed in claim 1, wherein the polymer moiety is selected from the group consisting of polymers and copolymers of anionically polymerizable monomers, cationically polymerizable monomers, anionically and cationically ring-openable monomers, and free radical polymerizable monomers.

4. The olefin/cycloolefin/alkylstyrene copolymer as claimed in claim 1, wherein the polymer moiety is a polymer of anionically polymerizable monomers.

5. The olefin/cycloolefin/alkylstyrene copolymer as claimed in claim 4, wherein the anionically polymerizable monomer is selected from the group consisting of conjugated dienes, vinyl aromatic compounds, vinyl unsaturated amides, acenaphthylene, 9-acrylcarbazole, acrylonitrile, methacrylonitrile, organic isocyanates, acrylates, methacrylates, alkyl acrylates, alkyl methacrylates, glycidyl methacrylates, vinyl pyridines, and mixtures thereof.

6. The olefin/cycloolefin/alkylstyrene copolymer as claimed in claim 3, wherein the cationically polymerizable monomer is selected from the group consisting of vinyl aromatic compounds, vinyl ethers, N-vinylcarbazole, isobutene, and mixtures thereof.

7. The olefin/cycloolefin/alkylstyrene copolymer as claimed in claim 3, wherein the ring-openable monomer is selected from the group consisting of cyclic ethers, sulfides, lactones, lactams, N-carboxyanhydrides, cyclic anhydrides, and mixtures thereof.

8. The olefin/cycloolefin/alkylstyrene copolymer as claimed in claim 3, wherein the free radical polymerizable monomer is selected from the group consisting of vinyl aromatic compounds, conjugated dienes, acrylates, methacrylates, alkyl acrylates, alkyl methacrylates, vinyl acetates, and mixtures thereof.

9. An olefin/cycloolefin/alkylstyrene copolymer comprising the following repeating units:

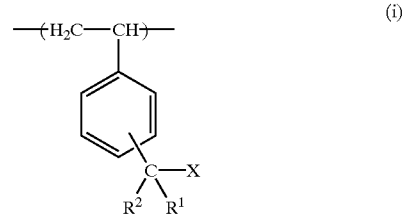
(i)

wherein
$R^1$ and $R^2$ are independently selected from the group consisting of hydrogen, alkyl, and primary and secondary haloalkyl,
X can be the same or different and is an alkali or alkaline earth metal;

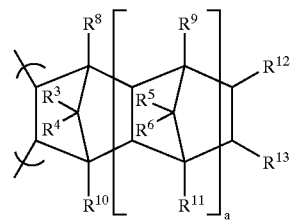
(ii)

wherein
a is an integer from 0 to 3,
$R^3$, $R^4$, $R^5$, $R^6$, $R^8$, $R^9$, $R^{10}$, and $R^{11}$ can be the same or different and are selected from the group consisting of hydrogen, halogen, $C_{1-10}$ alkyl, and haloalkyl and
$R^{12}$ and $R^{13}$ can be the same or different and are selected from the group consisting of hydrogen, halogen, $C_{1-10}$ alkyl, haloalkyl, aryl, haloaryl, alcohol, ester, and acid, or $R^{12}$ and $R^{13}$ can be bonded together to form formula (III)

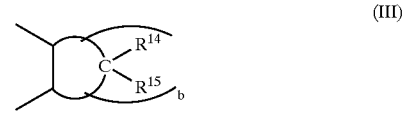
(III)

wherein
$R^{14}$ and $R^{15}$ can be the same or different and are selected from the group consisting of hydrogen, halogen, $C_{1-10}$ alkyl, and haloalkyl and
b is an integer from 3 to 5; and

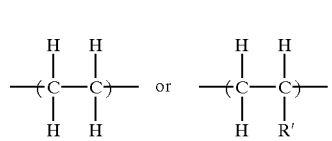
(iii)

wherein
R' is $C_1$ to $C_{18}$ linear or branched alkyl.

10. The olefin/cycloolefin/alkylstyrene copolymer as claimed in claim 9, wherein R' in repeating unit (iii) is $C_1$ to $C_5$ primary or secondary alkyl.

* * * * *